United States Patent
Conway (10) Patent No.: US 9,114,739 B2
(45) Date of Patent: Aug. 25, 2015

(54) CHILD CAR SEAT WITH HEIGHT ADJUSTABLE HEAD REST AND ADJUSTMENT MECHANISM FOR SAME

(71) Applicant: William Elias Conway, Marietta, GA (US)

(72) Inventor: William Elias Conway, Marietta, GA (US)

(73) Assignee: Graco Children's Products Inc., Atlanta, GA (US)

(*) Notice: Subject to any disclaimer, the term of this patent is extended or adjusted under 35 U.S.C. 154(b) by 0 days.

(21) Appl. No.: 13/894,410

(22) Filed: May 14, 2013

(65) Prior Publication Data
US 2013/0320725 A1    Dec. 5, 2013

Related U.S. Application Data

(60) Provisional application No. 61/646,359, filed on May 14, 2012.

(51) Int. Cl.
*B60N 2/28* (2006.01)
(52) U.S. Cl.
CPC ............ *B60N 2/2851* (2013.01); *B60N 2/2863* (2013.01)
(58) Field of Classification Search
CPC .................................................... B60N 2/2851
USPC .......................... 297/250.1, 353, 410, 411.36
See application file for complete search history.

(56) References Cited

U.S. PATENT DOCUMENTS

| | | | |
|---|---|---|---|
| 5,346,284 A * | 9/1994 | Dauphin | 297/411.36 |
| 5,462,338 A * | 10/1995 | Baumann | 297/411.37 |
| 6,623,074 B2 | 9/2003 | Asbach et al. | |
| 6,974,189 B2 * | 12/2005 | Machael et al. | 297/411.36 |
| 7,055,903 B2 * | 6/2006 | Balensiefer et al. | 297/256.11 |
| 7,066,536 B2 * | 6/2006 | Williams et al. | 297/250.1 |
| 7,232,185 B2 * | 6/2007 | Hartenstine et al. | 297/250.1 |
| 7,306,284 B2 * | 12/2007 | Horton et al. | 297/250.1 |
| 7,775,593 B2 * | 8/2010 | Hu | 297/353 |
| 7,841,665 B2 * | 11/2010 | Geister et al. | 297/411.36 |
| 7,862,117 B2 | 1/2011 | Hutchinson et al. | |
| 8,573,693 B2 * | 11/2013 | Gaudreau, Jr. | 297/250.1 |
| 2003/0193225 A1 * | 10/2003 | Kain | 297/250.1 |
| 2007/0228788 A1 * | 10/2007 | Meeker et al. | 297/250.1 |

FOREIGN PATENT DOCUMENTS

WO    WO2010075531 A2    7/2010

* cited by examiner

*Primary Examiner* — Peter Brown
(74) *Attorney, Agent, or Firm* — Lempia Summerfield Katz LLC

(57) ABSTRACT

A child car seat has a seat back with an upper end and a head rest coupled to the seat back near the upper end. The head rest is vertically adjustable along the seat back between a raised position and a lowered position. The car seat has an adjustment mechanism with an actuator and a lock element. The lock element is movable between a locked condition preventing vertical adjustment of the head rest and an unlocked condition permitting vertical adjustment of the head rest. The actuator is actuable to reconfigure the adjustment mechanism between a locked arrangement blocking the lock element in the locked condition, a released arrangement unblocking the lock element from the locked condition, and an unlocked arrangement whereby the lock element is in the unlocked condition.

20 Claims, 7 Drawing Sheets

CHILD CAR SEAT WITH HEIGHT ADJUSTABLE HEAD REST AND ADJUSTMENT MECHANISM FOR SAME

RELATED APPLICATION DATA

This patent is related to and claims priority benefit of U.S. Provisional application Ser. No. 61/646,359 filed on May 14, 2012 and entitled "Child Car Sear Head Rest and Adjustment Mechanism for Same." The entire content of this prior filed provisional application is hereby incorporated herein by reference.

BACKGROUND

1. Field of the Disclosure

The present disclosure is generally directed to children's car seats, and more particularly to a head rest adjustment mechanism and lock for same.

2. Description of Related Art

Child car seats are well known in the art. Many have a height adjustable head rest on the upper end of the seat back. There are myriad different adjustment and release mechanisms that are employed on such car seats. For example, a head rest adjustment mechanism is described in U.S. Pat. No. 7,232,185 owned by Graco Children's Products Inc. (Graco), the assignee of the present disclosure. In the '185 patent, the head rest locks into selected ones of a number of optional notches in rails extending vertically along the seat back of the seat. When an actuator is pressed, a locking element is retracted, allowing spring fingers to flex out of the holes and allow for sliding vertical adjustment of the head rest.

Because the flex fingers must be bent, the locking elements that engage with the slots or holes in the rails have a generous lead in/lead out. Also, the flex fingers are not positively locked or blocked while in the engaged or locked position. The flex fingers thus can flex and unlock when the car seat experiences heavy, sudden loads or acceleration, such as during a most severe crash. Thus, it is possible that the flex fingers do not remain locked during such an event. This might allow the head rest to move up or downward during the crash event, even though the actuator has not been pressed or actuated.

In another example, U.S. Pat. No. 6,623,074 describes a method for locking and unlocking a head rest adjustment mechanism. The disclosed device has a cam mechanism to disengage a locking rod from notch features provided in the back side of the shell, which is returned with a spring (see FIG. 1 of the '074 patent). The '074 patent also does not disclose providing any type of blocking feature for the locking elements while in the locked or engaged position.

A number of other patent publications disclose various car seat head rest and adjustment features and components, such as international publication no. WO2010075531 entitled "Child Safety Seat with Height Adjustable Harness" (Graco); U.S. Pat. No. 7,862,117 entitled "Head Rest and Harness Adjustment for Child Car Seat" (Wonderland Nursery Goods); and U.S. Pat. No. 7,232,185 entitled "Adjustable Head Rest for Child Car Seat" (Graco). These publications also do not disclose any type of blocking feature on the height adjustable head rests for the locking elements when in the locked or engaged position.

SUMMARY

In one aspect according to the teachings of the present disclosure, a child car seat has a seat back with an upper end and a head rest coupled to the seat back near the upper end. The head rest is vertically adjustable along the seat back between a raised position and a lowered position. The car seat has an adjustment mechanism with an actuator and a lock element. The lock element is movable between a locked condition preventing vertical adjustment of the head rest and an unlocked condition permitting vertical adjustment of the head rest. The actuator is actuable to reconfigure the adjustment mechanism between a locked arrangement blocking the lock element in the locked condition, a released arrangement unblocking the lock element from the locked condition, and an unlocked arrangement whereby the lock element is in the unlocked condition.

In one aspect according to the disclosure, the adjustment mechanism can have one or more slide rails along which the head rest can slide when height adjusted.

In one aspect according to the disclosure, the adjustment mechanism can have a pair of laterally spaced apart slide rails on the seat back.

In one aspect according to the disclosure, the adjustment mechanism can have tracks provided on the seat back and the head rest can have a carrier with guides that slide along the tracks.

In one aspect according to the disclosure, the lock element can be a bell crank with a lock tab that seats in an indexing slot in the locked condition.

In one aspect according to the disclosure, the lock element can include a pair of bell cranks In one aspect according to the disclosure, the actuator can have a grip and can have a rod extending from the grip.

In one aspect according to the disclosure, the actuator can have a grip and can have a pair of rods extending from the grip.

In one aspect according to the disclosure, the actuator can have a rod with a blocking end that blocks the lock element in the locked condition.

In one aspect according to the disclosure, the adjustment mechanism can have a rod with a blocking end that blocks the lock element in the locked condition.

In one aspect according to the disclosure, the adjustment mechanism can have a lost motion slot and the lock element can have an actuation arm captured within the lost motion slot.

In one aspect according to the disclosure, the actuator can have a rod with a blocking end that blocks the lock element in the locked condition and can have a lost motion slot with a portion of the lock element captured in the lost motion slot.

In one aspect according to the disclosure, the actuator can have a drive link segment with a blocking end that blocks the lock element in the locked condition.

In one aspect according to the disclosure, the actuator can have a drive link segment with a blocking end that blocks the lock element in the locked condition and a lost motion slot with a portion of the lock element captured within the lost motion slot.

In one aspect according to the disclosure, the adjustment mechanism can have components can have components that are recessed into a cavity in the seat back.

In one aspect according to the disclosure, the adjustment mechanism can have a slide rail that is recessed into a cavity in the seat back and the lock element and portions of the actuator can also be recessed within the cavity.

In one aspect according to the teachings of the present disclosure, a child car seat has a seat back with an upper end, a slide rail along the seat back, and a head rest coupled to the seat back near the upper end. The head rest is vertically adjustable along the slide rail between a raised position and a lowered position relative to the upper end. The car seat has a lock element movable between a locked condition preventing vertical adjustment of the head rest and an unlocked condition permitting vertical adjustment of the head rest. An actuator is actuable between: 1) a locked position whereby the lock element is blocked in the locked condition; 2) an intermediate released position whereby the lock element is not blocked in the locked condition; and 3) an unlocked position whereby the lock element is retained in the unlocked condition.

The various features and aspects of the car seat disclosed and described herein can be used independent of one another and/or in combination with one or more of the other features and aspects of the disclosure. The disclosure is not limited only to those specific combinations of features and aspects that are presented herein. Further, where only one particular component, feature, or aspect is mentioned herein, it is possible that multiples of such components, features, and aspects may be utilized.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed car seat or child safety seat has a head rest that is height adjustable relative to an upper end of the seat back on the car seat. The disclosed car seat and head rest include an adjustment mechanism that solves or improve upon one or more of the above-noted and/or other problems and disadvantages with prior known car seats and head rests of this type. In one aspect of the disclosure, the adjustment mechanism can employ one or more slide rails that are carried on or mounted to the seat back on the car seat. In one aspect of the disclosure, such one or more slide rails can be nested into one or more corresponding cavities, recesses or pockets in or on a surface of the seat back to lie flush with or below the level of the surface. In one aspect of the disclosure, the adjustment mechanism can include one or more lock or latch elements. Such one or more lock or latch elements can be blocked and retained in a locked condition by a portion of the adjustment mechanism when the adjustment mechanism is in a locked or non-actuated arrangement. In one aspect of the disclosure, the adjustment mechanism can include an actuator that, when partly actuated, unblocks one or more locking elements but leaves the one or more locking elements in a locked condition. In one aspect of the disclosure, the adjustment mechanism can include an actuator that, when fully actuated, unblocks one or more locking elements and also unlocks the locking elements, freeing the head rest for vertical adjustment relative to the seat back. In one aspect of the disclosure, the adjustment mechanism can include one or more slide rails nested within a surface of the seat back. Components of the adjustment mechanism can be configured to lay or fit within a profile of the one or more slide rails. These and other objects, features, and advantages of the disclosed car seat will become apparent to those having ordinary skill in the art upon reading this disclosure.

Figure 1:
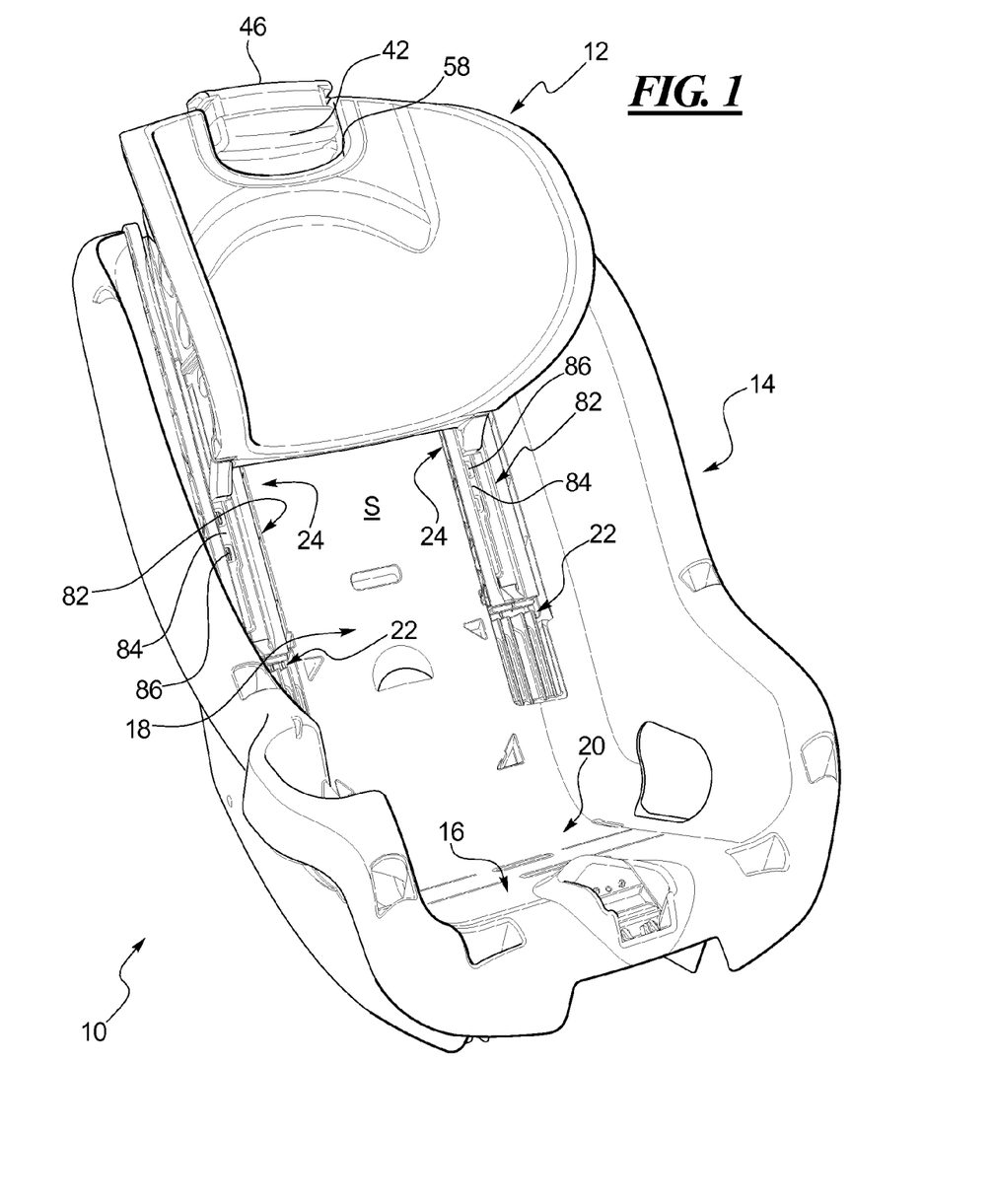
FIG. 1 shows a front perspective view of one example of a car seat with a head rest constructed in accordance with the teachings of the present invention and with the head rest in a raised position.
Figure 2:
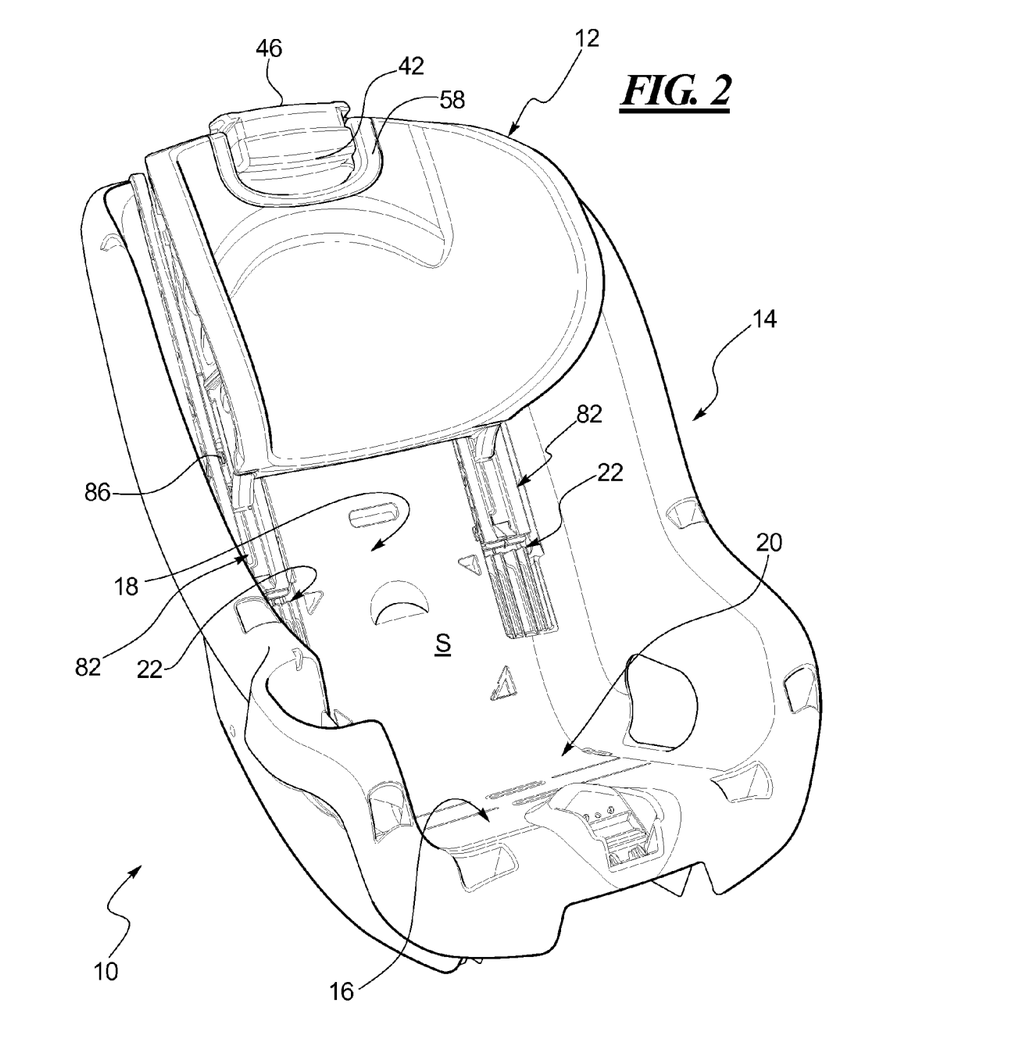
FIG. 2 shows the car seat of FIG. 1 but with the head rest in a lowered position.

Turning now to the drawings, FIG. 1 shows one example of a child safety seat or car seat 10 constructed in accordance with the teachings of the present invention. The car seat 10 is shown having a head rest 12 that is height adjustable on the car seat. As is known in the art, the car seat 10 can be constructed having a one-piece molded seat shell 14 that defines a seat bottom 16 and a seat back 18 formed as an integral unitary structure. A rear end of the seat bottom 16 is joined to a lower end of the seat back 18 at a seat bight region 20. The disclosed head rest 12 can be connected, mounted, or otherwise attached to an upper end of the seat back portion 18. As shown in FIGS. 1 and 2, the head rest 12 is height adjustable or vertically adjustable, i.e., adjustable in a generally vertical direction up and down relative to the upper end of the seat back 18. In one example, the head rest 12 can be adjustable between a raised position (FIG. 1) and a lowered position (FIG. 2). The head rest 12 can also be adjustable among one or more selectable intermediate positions between the raised and lowered positions, if desired, and as will become apparent below.

The car seat 10 is shown herein without any soft goods applied to the surfaces of the seat shell 14. The soft goods are eliminated in order to better illustrate aspects, components, and features of the disclosed head rest and car seat. In use, the car seat 10 may typically have one or more fabric and/or other soft good layers applied to the seat shell 14 and perhaps to the head rest 12 as well. The car seat 10 may also be constructed having separate seat back and seat bottom components that are attached or joined to one another for use. The car seat 10 may also be provided having additional accessories and other features not relevant to the present disclosure. The disclosed seat shell 14 can be molded using any suitable process, such as injection molding, and can be formed from any suitable polymer or other materials. The materials and processes used to construct the car seat 10 are also not particularly relevant the present disclosure. Thus, as will become evident to those having ordinary skill in the art upon reading this disclosure, the configuration and construction of the car seat 10 can vary from the example shown and described herein.

As shown in FIGS. 1 and 2, a surface S of the seat back 18, such as the front facing seating surface, can be formed with one or more cavities, recesses, or pockets 22. These cavities 22 can be provided to mount the head rest 12 in a sliding manner on the car seat. The head rest 12 is mounted to the car seat in cooperation with an adjustment mechanism 24. Components of the head rest 12 and the adjustment mechanism 24 are best illustrated in exploded view in FIG. 3. The head rest 12 can include a base or shell part 26 that defines the form of the head rest. The base 26 can be a relatively rigid structure and can be a molded polymer component, similar to the seat shell 14, as is known in the art. A softer, deformable layer 28 can be attached or otherwise secured to the base 26 to provide a head contacting surface of the head rest 12, also as is known in the art. In one example, the deformable layer 28 can be formed of a foam material, such as expanded polystyrene (EPS), which can absorb energy and help to distribute loads upon head contact with a seat occupant during a crash event. As with the basic form and structure of the car seat 10, the basic form and structure of the head rest 12 can also vary in configuration and construction from the example shown and described herein.

Figure 3:
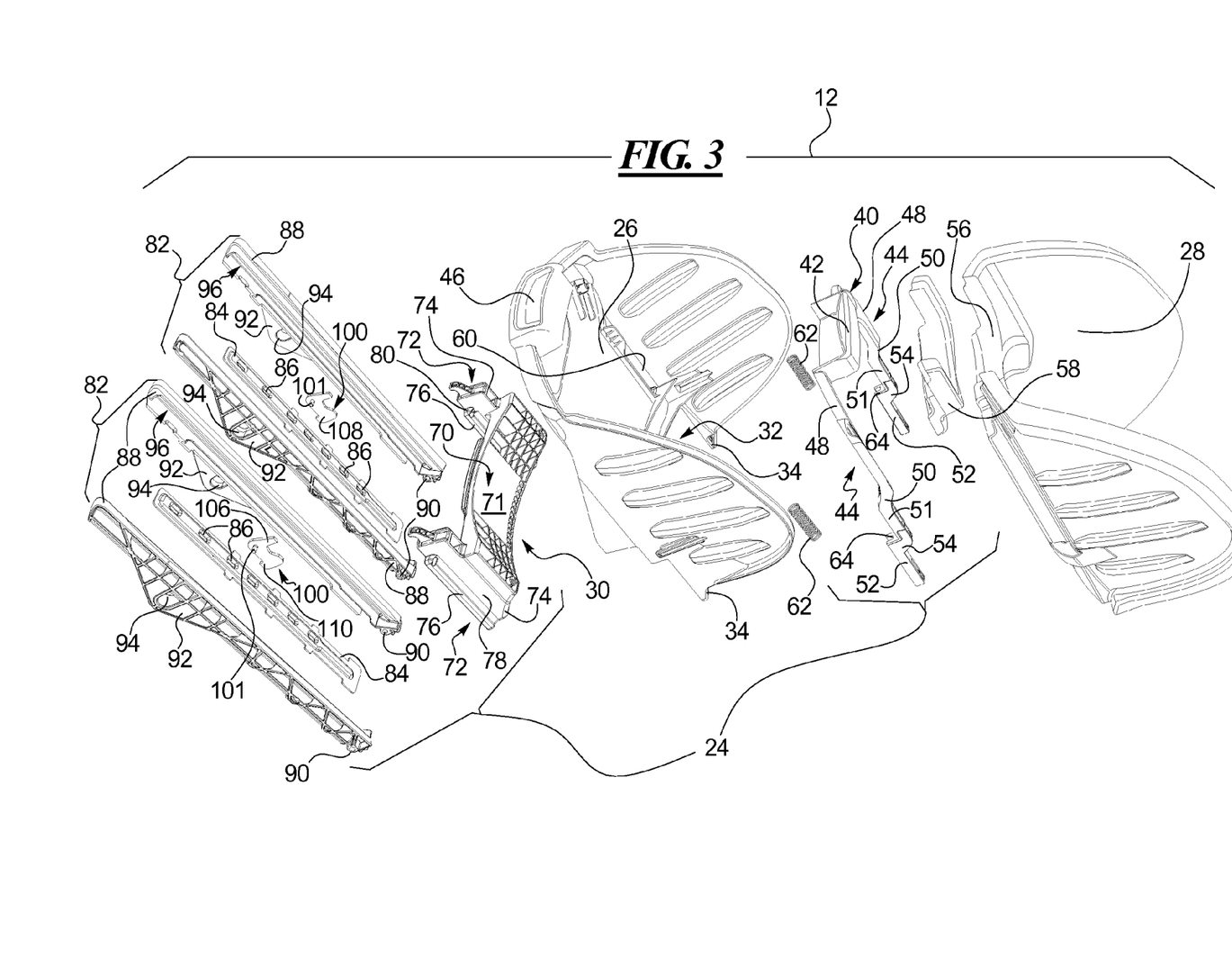
FIG. 3 shows an exploded view of the head rest of FIG. 1 and including the components of an adjustment mechanism for same.

In this example, the assembled base 26 and deformable layer 28 of the head rest 12 are mounted or otherwise connected, fastened, attached, or secured to a carrier 30. The carrier 30 can be considered part of the adjustment mechanism 24 or can just as easily be considered a part of the head rest 12. As such, the carrier 30 can be a separate component to which the base 26 is attached, connected, or fastened or the carrier can be an integral part of the base of the head rest 12. In this example, the base 26 and deformable layer 28 are mounted or affixed to the carrier 30 and can slide or move therewith in order to adjust the height of the head rest 12 on the seat back 18 as noted above and shown in FIGS. 1 and 2. The base 26 can have a space 32 or cut-out, such as at a lower edge 34 of the base, into which the carrier 30 can fit or nest when attached to the base.

Also as shown in FIG. 3, the adjustment mechanism 24 has an actuator 40 with a hand or finger grip 42 that is centrally located between a pair of rods 44. The rods 44 are integrally formed as extensions of the grip 42 in this example and are arranged to give the actuator 40 a U-shape that is inverted when installed on the head rest 12. A fixed leverage or reaction surface 46 is provided on the top end of the head rest 12. In this example the leverage surface 46 is formed integrally as a part of the base 26 of the head rest. Each of the rods 44 has an elongate arm segment 48 that is connected to a respective lateral end or side of the grip 42. Each of the rods 44 also has a first step segment 50 between the other end of the respective arm segment 48 and one end of an intermediate segment 51. The step segments 50 define a first bend in the respective rods 44 and position the intermediate segments 51 out of plane with the arm segments 48. Each rod 44 terminates at a free end in a drive link segment 52. Each drive link segment 52 is connected to the other end of the respective intermediate segment 51 at a second step segment 54. Each second step segment 54 defines a second bend in the respective rod 44. The second step segments 54 position the corresponding drive links 52 further out of plane with the respective arm segments 44 and in the same direction as the first step segments 50. In this example, each of the step segments 50 and 54 creates a bend in the respective rods 44 in the direction from a front facing side to a rear side of the head rest 12.

When the head rest 12 is assembled, the actuator 40 is sandwiched between the base 26 and the deformable layer 28. A scallop 56 in the top end of the deformable layer 28 exposes the grip 42 on the front facing side of the head rest 12. In this example, a bezel or trim piece 58 is assembled to the head rest and helps to create a pocket on the front facing side of the head rest 12 while exposing the grip 42 and the fixed leverage surface 46. The bent rods 44 extend through openings 60 in the base 26 of the head rest 12 so that the arm segments 48 each transition from the front facing side to the back side of the head rest. The drive link segments 52 are exposed on the back side of the head rest 12.

The actuator 40 in this example includes a pair of the rods 44. As will be evident to those having ordinary skill in the art, the actuator may include only one of the rods 44 or can include three or more of the rods, if desired. The rods 44 are also disclosed as being integrally formed or molded as part of the grip 42. In another example, each rod 44 can be a separate element that is fastened or otherwise attached to the grip 42. The actuator 40 can be formed as a molded polymer component using an injection molding or other suitable process. In another example, the actuator 40 can be fabricated from multiple different materials and form materials other than polymers. For example, the arm segments 48 can be metal straps, wires, push-pull cables, or the like. Each rod 44 is also shown and described as having a specific bent configuration. The configuration of the rods 44, as well as the grip 42, can vary depending on the shape and configuration of the adjacent surfaces of the head rest 12. The actuator 40 can be varied in structure, composition, and configuration from the example shown and described and yet function as intended.

Figure 4:
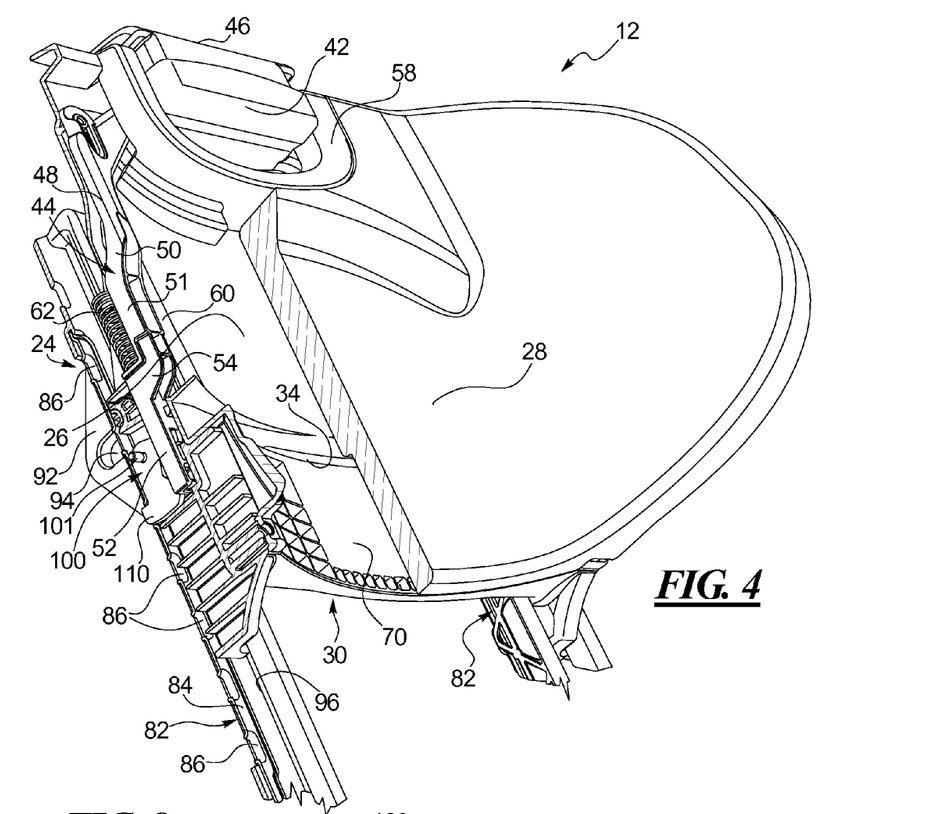
FIG. 4 shows front and side perspective and partial cutaway view of the assembled head rest and adjustment mechanism of FIG. 3 with the actuator in an unactuated or locked position and the adjustment mechanism in a blocked and locked arrangement.

The actuator 40 in this example is biased downward to an unactuated or locked position, as depicted in FIGS. 1, 2, and 4. One way in which to bias the actuator 40 to the locked position is to incorporate one or more springs or biasing elements into the adjustment mechanism 24. In this example, a compression spring or coil spring 62 is associated with each of the rods 44. Specifically, an exposed proximal end face 64 is provided on each of the drive link segments 52 adjacent the respective second step segment 54. When the adjustment mechanism is assembled, one of the springs 62 is borne against each of the end faces 64. The opposite end of each spring can be borne against a fixed surface (not shown herein) on either the base 26 or the carrier 30. Each spring 62 biases the actuator 40 in a downward direction. Thus, the grip 42 is biased downward away from the fixed leverage surface 46 on the head rest 12 in the locked position.

As shown in FIGS. 3 and 4, the carrier 30 can have a central body 70 that extends between a pair of laterally spaced apart skates 72. The central body 70 is the portion of the carrier 30 that fills in the space 32 in the base 26 when the head rest 12 is assembled in this example. Each of the skates 72 has a boot part 74 that is connected to one of the free sides of the central body 70. Each skate 72 protrudes rearward from the central body. Each boot part 74 has a pair of guides 76 in the form of linear ribs, one each protruding from the respective outer facing surface 78 and inner facing surface 80 of the corresponding boot part.

The carrier 30 in this example includes two of the boot parts 74 in order to correspond with the number of related components of the adjustment mechanism. However, the carrier 30 may include only one of the boot parts or may include three or more of the boot parts as needed for a particular configuration and construction of the adjustment mechanism. The central body 70 and the skates 72 can also be formed as an integral, one-peace molded structure from a polymer or other suitable material and using an injection molding or other suitable process. However, the central body 70 can also be formed from one or more different materials and having two or more separate components that are fastened or otherwise connected to one another. The central body 70 can have one side, i.e., a front facing side 81 that is configured to mirror and complete the front facing side of the base 26 on the head rest 12. The opposite side, i.e., the back side of the central body 70 can vary considerably in configuration and construction. As noted above, the carrier 30 can be formed as an integral portion of the base 26 instead of as a separate component. In another example, the central body 70 can be an integral part of the base 26 whereas the skates 72 can be separate components fastened or otherwise attached to the base. The carrier 30 can be varied in structure, composition, and configuration from the example shown and described herein and yet function as intended.

The adjustment mechanism 24 also includes a pair of slide rails 82, one corresponding to each of the rods 44 in the disclosed example. In this example, the slide rails 82 are spaced apart laterally on the seat back 18 of the car seat 10. One of the slide rails 82 is nested in each of the cavities 22 in the seat back 18. FIG. 3 shows the components of each of the slide rails 82. Each slide 82 is constructed having a sturdy positioning strip 84 that incorporates a plurality of indexing or positioning holes or slots 86 along the strip. In one example, each positioning strip 84 can be a metal strip of material. The number of indexing holes or slots 86 can define the number of selectable height adjustment positions available for the head rest 12. Thus, each positioning strip 84 should have at least two of the indexing holes or slots 86, but can certainly incorporate three or more of the holes or slots. The uppermost indexing hole or slot 86 can define the raised position of the head rest 12 as shown in FIG. 1. Likewise, the lowermost indexing hole or slot 86 can define the lowered position of the head rest 12 as shown in FIG. 2.

In this example, each positioning strip 84 is sandwiched by and captured between a pair of elongate rail segments 88 in slim pockets 89 formed in each segment. The rail segments 88 can be injection molded or otherwise formed of a polymer material in one example. In other examples, the rail segments 88 can be formed as a one-piece structure, can be formed to integrally incorporate the indexing holes or slots 86 (eliminating the strip 84), and/or can be formed of other materials and processes. In one example, the rail segments 88 can be formed to snap together when assembled.

A lower end of each of the rail segments 88 includes a fastener opening 90. This fastener opening can be used to attach the rail segments 88 together to form each slide rail 82 and/or to secure the slide rails 82 to the seat back 18. Likewise, a mounting extension 92 protrudes from a back side of each of the rail segments 88 in this example. When assembled, the mounting extensions 92 of each pair of rail segments 88 mate with one another and defined a mounting bracket with a fastener hole 94 on each of the slide rails 82. When the slide rails 82 are positioned on the seat back 18 within the cavities 22, the fastener holes 94 can be exposed on the back side of the seat back 18, protruding through the seat shell 14. Separate fasteners or a single transverse attachment rod can be passed through the fastener holes 94 in order to secure the slide rails 82 in place on the seat back 18.

Each of the rail segments 88 also has an elongate linear groove 96 formed along a length of the segment. When the rail segments 88 of each of the slide rails 82 are assembled, the respective grooves 96 confront one another, as do the slim pockets 89. The positioning strip is captured within and between the slim pockets 89. The grooves 96 on each slide rail 82 define a slide track along each of the assembled slide rails 82. When assembled, each of the protruding guides 76 on the opposing side faces 78, 80 of the boot parts 74 on the skates 72 is positioned within a corresponding one of the grooves 96 in a respective one of the rail segments 88. The guides 76 can slide along the slide rails 82 within tracks in the slide rails 82 created by the grooves 96.

As indicated above, the configuration and construction of the slide rails 82 can vary within the spirit and scope of the present invention. The function of the slide rails 82 is to define the selectable head rest height adjustment positions available to the user on the car seat 10 as well as to allow sliding movement of the head rest 12 upward and downward relative to the upper end of the seat back 18. These functions can be achieved no modifications are made to the slide rails 82.

With reference to FIGS. 3 and 4, a locking element, such as a bell crank 100 can be pivotally secured via a pivot pin 101 or the like to each of the skates 72 on the back side of the carrier 30. Each bell crank 100 has a central pivot hole 102 and an actuation arm 104 that extends radially out from the pivot hole 102. The actuation arm 104 of each bell crank 100 extends forward away from the respective slide rail 82 and is captured in a lost motion slot 106 in the respective drive link segment 52 on one of the rods 44. Each bell crank 100 also has a latching arm 108 that extends radially our from the pivot hole 102, but in a direction about 90 degrees offset and downward from the actuation arm 104. A lock tab 110 protrudes at an angle rearward from a free end of the latching arm 108 on each bell crank 100. The lock tab 110 can protrude rearward into any one of the indexing holes or slots 86 in the positioning strip 84 of the slide rail 82, as described below.

Figure 5:
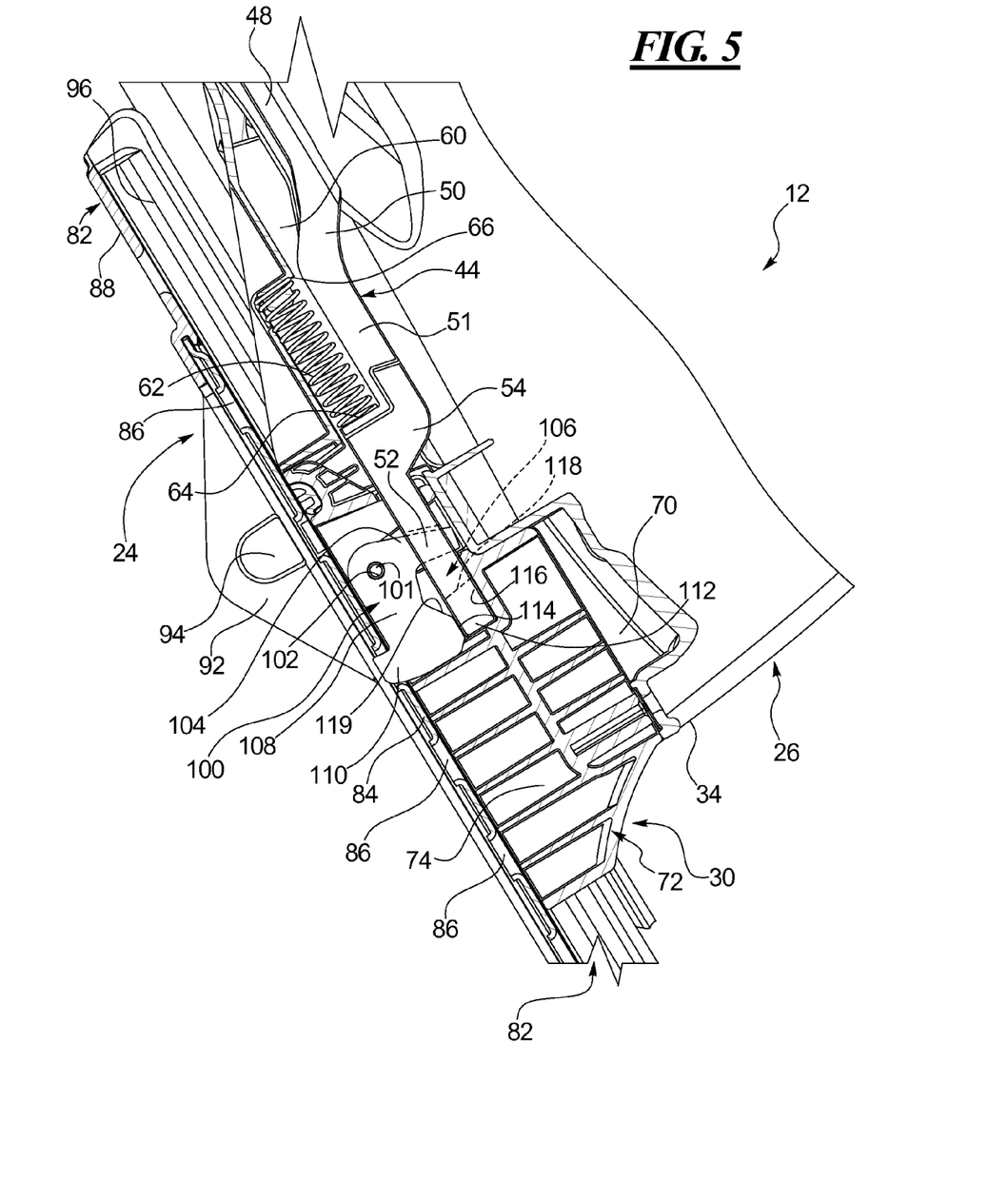
FIG. 5 shows a close up side view of portions of the adjustment mechanism of FIG. 4.

FIGS. 4 and 5 show portions of one side of the adjustment mechanism 24 with the actuator 40 in the locked position of FIGS. 1 and 4 and the adjustment mechanism components in a locked and blocked arrangement. In this actuator position, the bell crank 100 is in a blocked and locked condition. A blocking end 112 of the drive link segment 52 lies over and bears against a contact surface 114 on the latching arm 108 on the bell crank 100. The blocking end 112 retains the locking element in the locked condition and blocks it from moving out of the locked condition. The blocking end 112 is also borne against a fixed stop surface 116 on a portion of the carrier 30. Thus, the blocking end 112 is captured between the contact surface 114 of the bell crank and the fixed stop surface 116. The blocking end 112 cannot move when the actuator 40 is in the locked position. In this arrangement, the blocking end 112 securely holds the bell crank 100 in the locked condition and blocks the bell crank from pivoting about the pin 101. The lock tab 110 is seated in one of the indexing holes or slots 86 in the positioning strip 84 and cannot be retracted. Therefore, the head rest 12 is securely retained in place in the selected height position on the seat back 18 and the adjustment mechanism 24 is blocked and locked.

Figure 6:
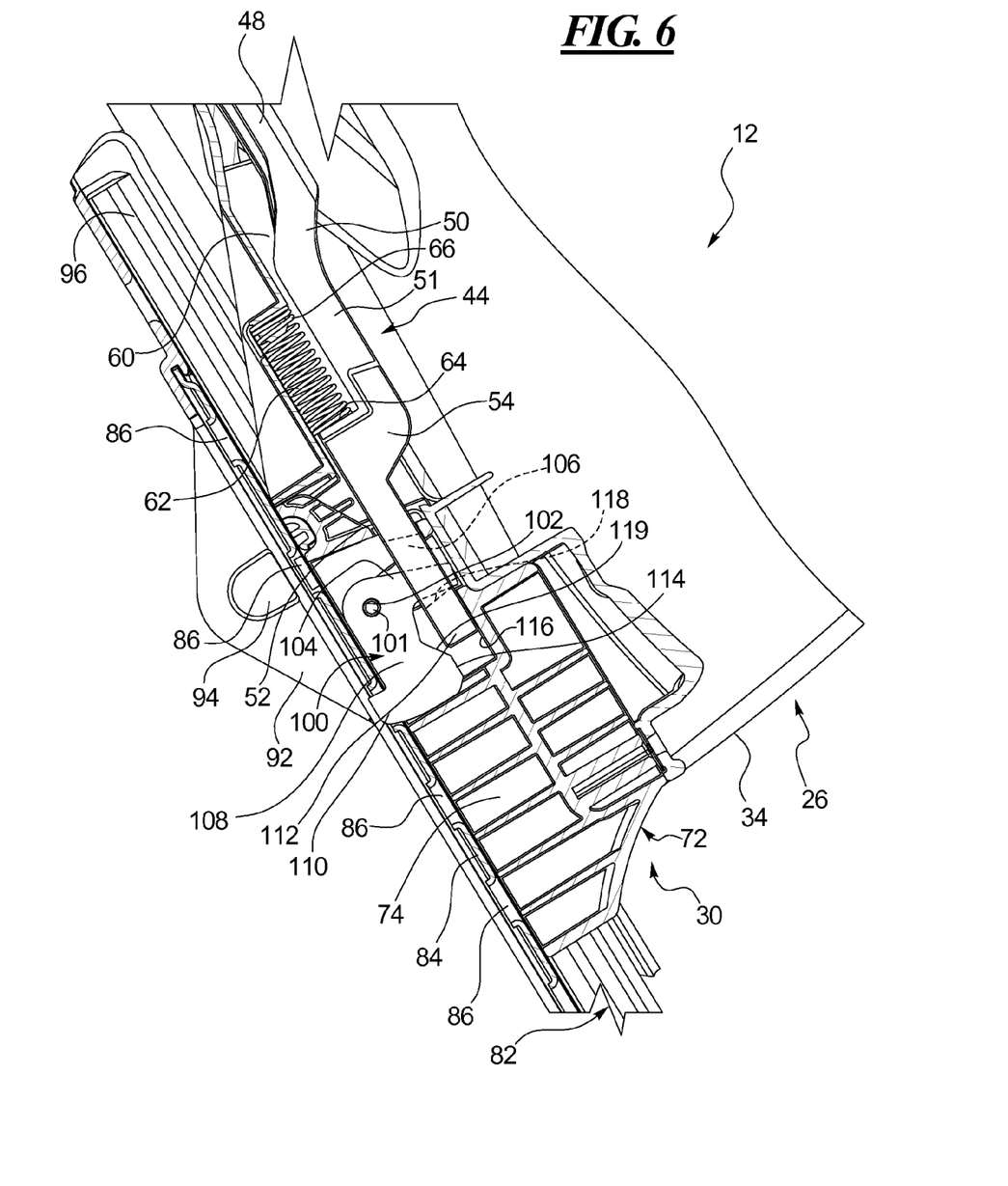
FIG. 6 shows the portions of the adjustment mechanism of FIG. 5, but in an unblocked but locked arrangement.

As shown in FIG. 6, the actuator 40 can be moved to an intermediate released position. The actuator is moved by a user placing their fingers under the grip 42 and their palm and/or thumb against the leverage surface 46. The user can squeeze the grip 42, which will move it upward toward the fixed leverage surface 46. Moving the grip 42 moves the rod 44. In this intermediate released position, the drive link segment 52 can travel upward a maximum distance limited by the length of the lost motion slot 106. As the drive link segment 52 moves upward, the lost motion slot 106 also moves upward. A lower end 118 of the slot 106 does not contact the actuation arm 104 on the bell crank 100 immediately upon moving the actuator. The blocking end 112, however, does immediately and simultaneously move in concert with the actuator 40. As the blocking end 112 clears the contact surface 114 on the latching arm 108, the bell crank is no longer blocked and can move. However, as the actuation arm 104 has not yet bottomed against the end 118 of the lost motion slot 106, the bell crank 100 is not yet moved from the locked condition with the lock tab 110 seated in the indexing hole or slot 86. The locking element is in an unblocked but still locked condition in this arrangement of the adjustment mechanism. The head rest 12 is thus still retained in place in the selected height position on the seat back 18.

Figure 7:
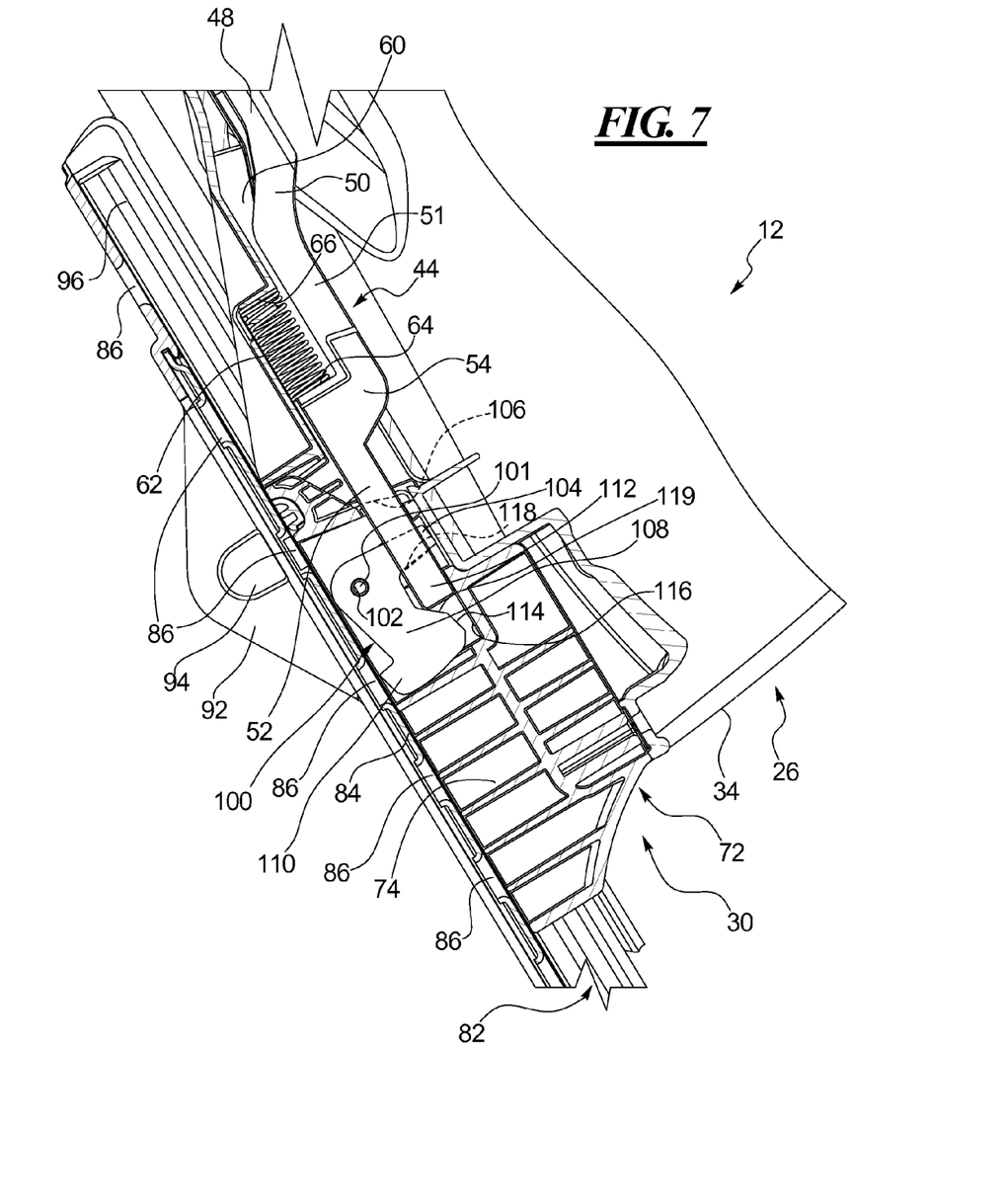
FIG. 7 shows the portions of the adjustment mechanism of FIGS. 5 and 6, but in an unblocked and unlocked arrangement, whereby the head rest can be adjusted between the raised and lowered positions of FIGS. 1 and 2, respectively.

As shown in FIG. 7, the actuator 40 can be further moved to an unlocked position whereby the grip 42 is fully squeezed upward. In one example, the grip 42 can be configured to hit a stop provided on the leverage surface 46 or some other portion of the base 26 or head rest 12. In this unlocked position, the drive link segment 52 travels further upward with the actuation arm 104 on the bell crank 100 contacting the lower end 118 in the lost motion slot 106. The lower end 118 will pull the actuation arm 104 upward, which will rotate the bell crank 100 about the pivot pin 101 in a counterclockwise direction in the figure. Rotation of the bell crank 100 withdraws the lock tab 110 from the indexing hole or slot 86. This unlocks and releases the head rest 12 rendering it free to slide up or down along the slide rail 82 to adjust the height.

In this example, the blocking end 112 can contact return surface 119 on the bell crank 100 when the bell crank is in the unlocked condition of FIG. 7. The user can release the actuator 40 by letting go of the grip 42. The user can do so when the head rest 12 is moved to a new desired height position on the seat back 18, whereby the bell crank is aligned with a selected indexing slot or hole 86. The user may also let go of the grip 42 after the head rest 12 is moved and the bell crank is misaligned with the indexing holes or slots 86. As soon as the user lets go of the grip 42, the springs 62 will fire the actuator 40 back toward the locked or unactuated position. Of the lock tab 110 is not aligned with one of the indexing holes or slots 86, the actuator return will be delayed. However, as soon as the lock tab 110 is aligned with an adjacent one of the indexing slots or holes 86 in the positioning strip 84, the springs 62 will fire the actuator 40 back to the locked or unactuated position. The direct contact between the blocking end 112 and the bell crank 100 will immediately also drive rotation of the bell crank and fire the lock tab 110 into the indexing hole or slot 86. If this direct contact between the blocking end 112 and the bell crank 100 was not present, the length of the lost motion slot 106 would delay firing of the bell crank to the locked condition until the other end of the lost motion slot 106 would contact the actuation arm 104. In a different embodiment, separate springs (not shown) can be provided for the bell crank 100 in order to independently bias the bell crank to the locked condition. For example, a torsion spring could be provided on each of the pivot pins 101 to accomplish this additional and optional function for each of the bell cranks 100.

If the adjustment mechanism 24 were to have only one of the slide rails 82, noted as an option above, only one of the rods 44 would be required for the actuator 40. Likewise, only one of the bell cranks 100 would also be needed. However, in this example, there are a pair of the slide rails 82 and thus a pair of the rods 44 and bell cranks 100. The other side of the adjustment mechanism 24 would function identically to the one described above and shown in FIGS. 5-7.

The configuration and construction of the adjustment mechanism 24 can vary within the spirit and scope of the present invention. Some examples are noted above with regard to the slide rails 82, the actuator 40, and the carrier 30. Other modifications can also be made within the spirit and scope of the present invention. For example, the slide rail function, i.e., at least the indexing slots or holes, can be provided on the movable head rest and the latching element or locking element function can be provided on the static seat back of the car seat. The configuration and construction of the bell crank 100 and the blocking end 112, as well as the drive link segment 52, of the actuator 40 can also be varied from the example shown and described herein.

Figure 8:
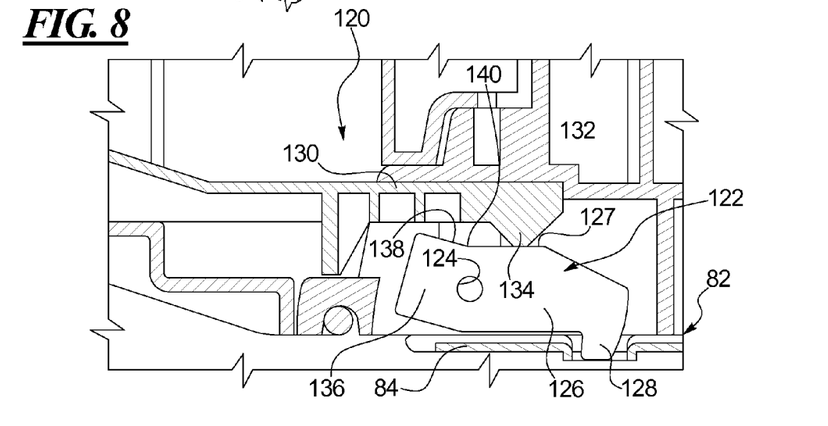
FIG. 8 shows another example of a portion of an adjustment mechanism constructed in accordance with the teachings of the present disclosure and in a blocked and locked arrangement.

FIG. 8 illustrates one possible example of a modified adjustment mechanism 120. In this example, the adjustment mechanism 120 includes a toggle lock or latch 122 that is different from the earlier described bell crank 100. In this example, the toggle latch 122 has a pivot hole 124 about which the toggle latch can pivot. The toggle latch 122 has a latching arm 126 that extends radially out from the pivot hole 124. The latching arm 126 has a contact surface 127 along one edge and has a lock tab 128 that protrudes at an angle from the free end of the arm. The lock tab 128 seats in a selected one of the indexing holes or slots 86 in the guide rail 82. The guide rail 82 in this example can be identical to the earlier described and like-numbered components.

The actuator in this example has a drive link segment 130 that is also modified in comparison to the earlier described drive link segment 52 of the actuator 40. The drive link segment 130 in this example has a blocking end 132 with a protrusion 134 on a surface of the blocking end. The protrusion 134 in this example bears against the contact surface 127 on the latching arm 126 and retains the toggle latch 122 in the locked condition shown in FIG. 8. The blocking end 132 on the drive link segment 130 is also born against a stop surface 135 provided on a portion of the car seat structure, such as the carrier 30, the head rest base 26, or the like. However, in this example, the blocking end 132 always rides against the stop surface 135.

The toggle latch 122 has a release arm 136 that extends radially out from the pivot hole 124. The release arm 136 is oriented non-parallel with the latching arm 126 but at an angle greater than 90 degrees. The release arm 136 also has a contact surface 138 that faces the protrusion 134 on the blocking end 132 of the drive link segment 130. The contact surface 138 and the contact surface 127 are on the same side of the toggle latch 122 and are arranged at an angle relative to one another. A shallow relief 140 is defined between the two contact surfaces 138, 127 on the toggle latch 122 and also faces the protrusion 134. Though not shown herein, if the actuator is moved to the intermediate released position described above (see FIG. 6), the protrusion 134 would lie within the relief 140 on the toggle latch 122. The toggle latch 122 would no longer be blocked but would not yet be unlocked because the toggle latch 122 would not yet be pivoted from the locked condition as shown. If the actuator were further moved to the completely unlocked position described above (see FIG. 7), the protrusion 134 will ride against the contact surface 138 on the release arm 136 of the toggle latch 122 and rotate the toggle latch in a counterclockwise direction. This rotation will withdraw the lock tab 128 from the locked condition and move it to the unlocked condition, free of the indexing slots or holes 86. This will allow the head rest 12 to be raised or lowered relative to the seat back.

A no-rethread harness system on a children's safety seat or car seat is often routed through the head rest and is height adjustable with the head rest. The harness system can be subjected to significant loading during a severe crash, especially when containing an occupant at the high end of the weight range. In the above-described problems with the prior art, a head rest latch may become compromised during such a crash. It is thus possible that the heavy loading on the harness system may pull the head rest during such a crash and change its height. The disclosed adjustment mechanisms provide an improved locking arrangement that positively locks the adjustment mechanism in the locked position, which can prevent the head rest from moving up or down unintentionally during a crash.

A method of locking the head rest mechanism while still allowing for adjustment when desired was thus determined to be a beneficial need. Such adjustment mechanisms are disclosed herein. The disclosed adjustment mechanisms also can maintain a small component envelope for the mechanism, can improve occupant comfort, and can result in a simple design when adding the mechanism package into a car seat product.

The disclosed mechanisms can also be used with existing car seat harness system designs and routing. The disclosed mechanisms also can release with an upward motion of an actuator, which improves ergonomics for the caregiver.

The disclosed adjustment mechanisms provide a more robust design that employs a lock or latch element that remains locked or latched unless the actuator is released. The disclosed adjustment mechanisms include locking elements, i.e., the locks or latches, which must be positively removed from the indexing slots or holes in the slide rails. This produces a very aggressive engagement between the head rest and the seat back.

The head rest adjustment components in the disclosed examples are completely contained in the slide rails embedded in the seat shell. The disclosed slide rails can be relatively simple in construction and inexpensive to manufacture because each rail can have two plastic or polymer rail sections with a central steel reinforcing piece, i.e., the positioning strip, captured between them. The slide rails can still, however, be very strong and durable by employing the steel or metal lock engagement part.

The adjustment system or mechanism is operated by squeezing or actuating a plastic or polymer actuator handle. The actuator actuates both sides of the adjustment mechanism simultaneously. The head rest is coupled to and rides on a carrier component that holds the head rest shell and the EPS layer or layers. The carrier component can be made from a high-strength material to withstand harness loading forces.

The actuator is spring biased downward to the locked position. The release motion of the actuator and the subsequent spring biased return motion uncovers or unblocks and covers or blocks, respectively, the mechanism locking elements. This can be an additional safeguard against misuse.

The example of FIGS. 5-7 provides a different interface between the actuator rods and the lock components than that of the example in FIG. 8. A greater mechanical advantage may be achieved in the example of FIG. 5-7 by producing a large lever arm for disengagement or unlocking The adjustment mechanism in either example can be returned to the locked position by compression springs at each of the rods. Another example could use a molded-in spring integrated into the actuator grip or a spring seating in the actuator grip. The adjustment mechanism in another example could have a separate return spring for the lock elements to prevent rattling of the mechanism during vehicle vibration. Other iterations of the disclosed adjustment mechanisms could include altered materials for lower or higher strength.

Instead of a rigid actuator, the adjustment mechanism could be actuated with cables pinned to the locking element or elements. This would allow for more flexibility in packaging the lock components with respect to the actuator grip and may allow for an alternate method of actuation. The disclosed adjustment mechanisms positively block the locking elements in the locked arrangement to prevent accidental disengagement.

Although certain car seat head rest adjustment mechanisms, features, and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child car seat comprising:
a seat back with an upper end;
a head rest coupled to the seat back near the upper end and vertically adjustable along the seat back between a raised position and a lowered position; and
an adjustment mechanism having an actuator carried on the car seat, a rod extending from and movable by the actuator, a plurality of positioning holes, and a lock element, the lock element movable by the rod between a locked condition seated in one of the plurality of positioning holes preventing vertical adjustment of the head rest and an unlocked condition unseated from the plurality of positioning holes permitting vertical adjustment of the head rest,
wherein the actuator is actuable to reconfigure the adjustment mechanism between a locked arrangement blocking the lock element in the locked condition, an intermediate released arrangement unblocking the lock element though still in the locked condition, and an unlocked arrangement whereby the lock element is in the unlocked condition.

2. A child car seat according to claim 1, the adjustment mechanism further comprising a slide rail along the seat back, the head rest vertically adjustable along the slide rail between the raised position and the lowered position relative to the upper end.

3. A child car seat according to claim 1, wherein the actuator is actuable between a locked position corresponding to the locked arrangement of the adjustment mechanism whereby the lock element is blocked in the locked condition, an intermediate released position corresponding to the intermediate released arrangement of the adjustment mechanism whereby the lock element is not blocked in the locked condition, and an unlocked position corresponding to the unlocked arrangement of the adjustment mechanism whereby the lock element is retained in the unlocked condition.

4. A child car seat according to claim 1, wherein the rod includes two of the rods spaced laterally apart from one another.

5. A child car seat according to claim 4, wherein the two rods are each an integral extension of the actuator and are formed as a single molded unit.

6. A child car seat according to claim 1, wherein the rod and the actuator are a one-piece molded plastic.

7. A child car seat according to claim 1, wherein the rod includes a lost motion slot that interacts with the lock element.

8. A child car seat according to claim 7, wherein a portion of the rod blocks the lock element in the blocked arrangement.

9. A child car seat according to claim 7, wherein a portion of the lock element is within the lost motion slot in the intermediate unblocked arrangement.

10. A child car seat according to claim 1, wherein the lock element is pivotable about an axis between the unlocked condition and the locked condition.

11. A child car seat according to claim 10, wherein the rod interacts with an arm of the lock element to pivot the lock element about the axis and to block the lock element.

12. A child car seat comprising:
a seat back with an upper end;
a head rest coupled to the seat back near the upper end, the head rest vertically adjustable along the seat back between a raised position and a lowered position;
an actuator carried on the car seat;
a rod extending from and movable by the actuator;
a plurality of positioning holes; and
a lock element movable by the rod between i) a locked condition seated in one of the plurality of positioning holes, the lock element thereby preventing vertical adjustment of the head rest and ii) an unlocked condition unseated from the plurality of positioning holes, the lock element thereby permitting vertical adjustment of the head rest, wherein the actuator is actuable to move the rod between a locked arrangement blocking the lock element in the locked condition, an intermediate released arrangement unblocking the lock element though still in the locked condition, and an unlocked arrangement whereby the lock element is in the unlocked condition.

13. A child car seat according to claim 12, further comprising:

two of the lock elements;

two of the rods, one of the two rods associated with each of the two lock elements; and two sets of the plurality of positioning holes, one set associated with each of the two lock elements.

14. A child car seat according to claim 13, further comprising two slide rails positioned to guide the head rest when vertically adjusted, each slide rail associated with a respective one of the two elements and the two rods carrying one of the two sets.

15. A child car seat according to claim 12, wherein the lock element is a bell crank.

16. A child car seat according to claim 15, wherein the rod has a blocking end with a lost motion slot, the blocking end in the locked arrangement captured between a surface on the bell crank and a fixed stop surface on the car seat fixing the blocking end in the locked arrangement and blocking the bell crank in the locked condition.

17. A child car seat according to claim 16, wherein the blocking end and the lost motion slot of the rod in the intermediate released arrangement are moved to unblock the bell crank but not to move the lock element from the locked condition.

18. A child car seat according to claim 16, wherein the blocking end and the lost motion slot of the rod in the unlocked arrangement are moved so as to move the bell crank to the unlocked condition.

19. A child car seat according to claim 12, wherein the lock element is a toggle latch with first and second contact surfaces on one side of the toggle latch, the first and second contact surfaces arranged at a non-parallel angle relative to one another and having a relief therebetween.

20. A child car seat according to claim 12, wherein the rod has a blocking end adjacent the one side of the toggle latch, wherein the blocking end i) bears against the first contact surface in the locked arrangement retaining the toggle latch in the locked condition, ii) bears against the relief in the intermediate released arrangement unblocking the toggle latch from the locked condition, and iii) bears against the second contact surface in the unlocked arrangement retaining the toggle latch in the unlocked condition.

* * * * *